United States Patent
Brown

[15] 3,653,512
[45] Apr. 4, 1972

[54] FLUID FILTER DEVICE
[72] Inventor: Carl A. Brown, Birmingham, Mich.
[73] Assignee: Parker-Hannifin Corporation, Cleveland, Ohio
[22] Filed: July 16, 1970
[21] Appl. No.: 55,385

[52] U.S. Cl. ............................210/130, 210/172, 210/232, 210/238
[51] Int. Cl. ......................................................B01d 35/28
[58] Field of Search ..........................210/130, 172, 232, 238

[56] References Cited

UNITED STATES PATENTS

| | | | |
|---|---|---|---|
| 3,493,110 | 2/1970 | Rosaen | 210/172 X |
| 2,718,310 | 9/1955 | Trahan | 210/232 X |
| 3,513,980 | 5/1970 | Masaschi et al. | 210/238 |
| 2,864,504 | 12/1958 | Jepson | 210/238 |

Primary Examiner—Reuben Friedman
Assistant Examiner—Frederick F. Calvetti
Attorney—Hauke, Gifford and Patalidis

[57] ABSTRACT

A fluid filter device having an elongated tubular housing submerged in a fluid reservoir, the housing having an opening registering with the filler opening of the reservoir. The tubular housing has an inlet for receiving fluid and an outlet for discharging fluid with a fluid filter disposed therebetween. An elongated rod disposed within the tubular housing has one end threadedly engaging a cap adapted to close the open end of the tubular housing. The lower portion of the tubular housing has a pair of parallel spaced walls which form a transversely extending opening through which the lower end of the rod is disposed. The lower end of the rod has a transversely extending section which forms a T and which engages the underside of the spaced walls when rotated 90° with respect to the transversely extending opening. A spring carried by the rod biases the T section of the rod into engagement with a slot formed on the underside of the spaced walls to prevent relative rotational movement between the rod and the tubular housing when the cap is threadedly attached to the rod.

6 Claims, 3 Drawing Figures

INVENTOR
CARL A. BROWN
BY
Hauke, Gifford & Patalidis
Attorneys

3,653,512

FLUID FILTER DEVICE

BACKGROUND OF THE INVENTION

1. Field of the Invention

The present invention relates to fluid filter devices and more specifically to a new means for mounting a cap to close the upper end of such fluid filter devices; and for supporting a filter element within such fluid filter devices.

2. Description of the Prior Art

Heretofore, filter devices have been provided in which the housing is carried in a submerged position in a reservoir of a fluid system and have included means for permitting the insertion and withdrawal of a filter element from the housing. Still other filters have been provided which are attached to an external side of the reservoir, but below the fluid level of the reservoir such that the fluid within the fluid filter device is above the filter element. Such previously used filter devices, in their simplest form, have been provided with a cap at the top end thereof which is normally threaded to an elongated rod disposed within a tubular housing that defines the outer portion of the filter device. The lower end of the rod is normally welded to the housing, while the top end of the rod threadably engages the cap. The removal of the cap from the threaded rod permits insertion and/or withdrawal of the filter element from the housing without the necessity of draining the fluid from the reservoir when the submerged type of housing is used and without requiring the use of a valving mechanism when the filter device is carried externally of the reservoir but below the fluid level.

In such previously used filter devices, the threaded surface at the upper end of the elongated rod, which supports the cap, has sometimes become damaged, thus preventing the recapping of the open end of the tubular housing. If the threaded surface of the elongated rod in such previously used filter devices is damaged, the entire filter housing must be removed and replaced. Normally, such filter devices are welded to the reservoir, thus their replacement is costly and time consuming.

It would therefore be desirable to provide a fluid filter device having a construction which readily permits the removal and replacement of the cap supporting rod.

SUMMARY OF THE INVENTION

The present invention, which will be described subsequently in greater detail, comprises a fluid filter device having an elongated tubular housing with an inlet for receiving fluid and an outlet for discharging fluid, and a filter element carried in the housing intermediate the inlet and outlet. The lower portion of the housing is provided with a pair of spaced parallel walls forming a transversely extending opening therebetween, with the bottom portion of each wall having notches which together form a slot intersecting both the longitudinal axis of the tubular housing and the axis of the transversely extending opening.

An elongated rod is disposed concentrically with the longitudinal axis of the tubular housing and has a transversely extending portion at the lower end so that the lower portion of the rod is T-shaped. The lower end of the rod is adapted to be inserted between and below the opposing faces of the spaced walls and rotated 90°, wherein the transversely extending section of the rod is received by the notches. A spring carried by the rod is adapted to bias the transversely extending section of the rod into the notches and into engagement with the walls to prevent relative rotational movement between the rod and the tubular housing. The upper end of the tubular housing has an opening for replenishing the supply of fluid in the fluid reservoir. The filler opening has a size accommodating the insertion and withdrawal of the filter element carried within the tubular housing and is enclosed by the cap. The upper end of the rod, which has a threaded surface, extends through a central aperture in the cap and is engaged by a nut or the like carried by the cap so as to securely retain the cap to the upper end of the tubular housing.

The elongated rod may be removed from the slot defined by the notched wall portions and replaced by a new rod in the event the threaded surface of the rod becomes damaged.

It is therefore an object of the present invention to provide a fluid filter device having a construction which permits the removal and replacement of the cap supporting rod without necessitating the complete removal and replacement of the fluid filter device.

Other objects, advantages, and applications of the present invention will become apparent to those skilled in the art of fluid filter devices when the accompanying description of an example of the best mode contemplated for practicing the invention is read in conjunction with the accompanying drawing.

BRIEF DESCRIPTION OF THE DRAWING

The description herein makes reference to the accompanying drawing in which like reference numerals refer to like parts throughout the several views, and in which.

DESCRIPTION OF THE PREFERRED EMBODIMENT

Figures 1, 2, 3:
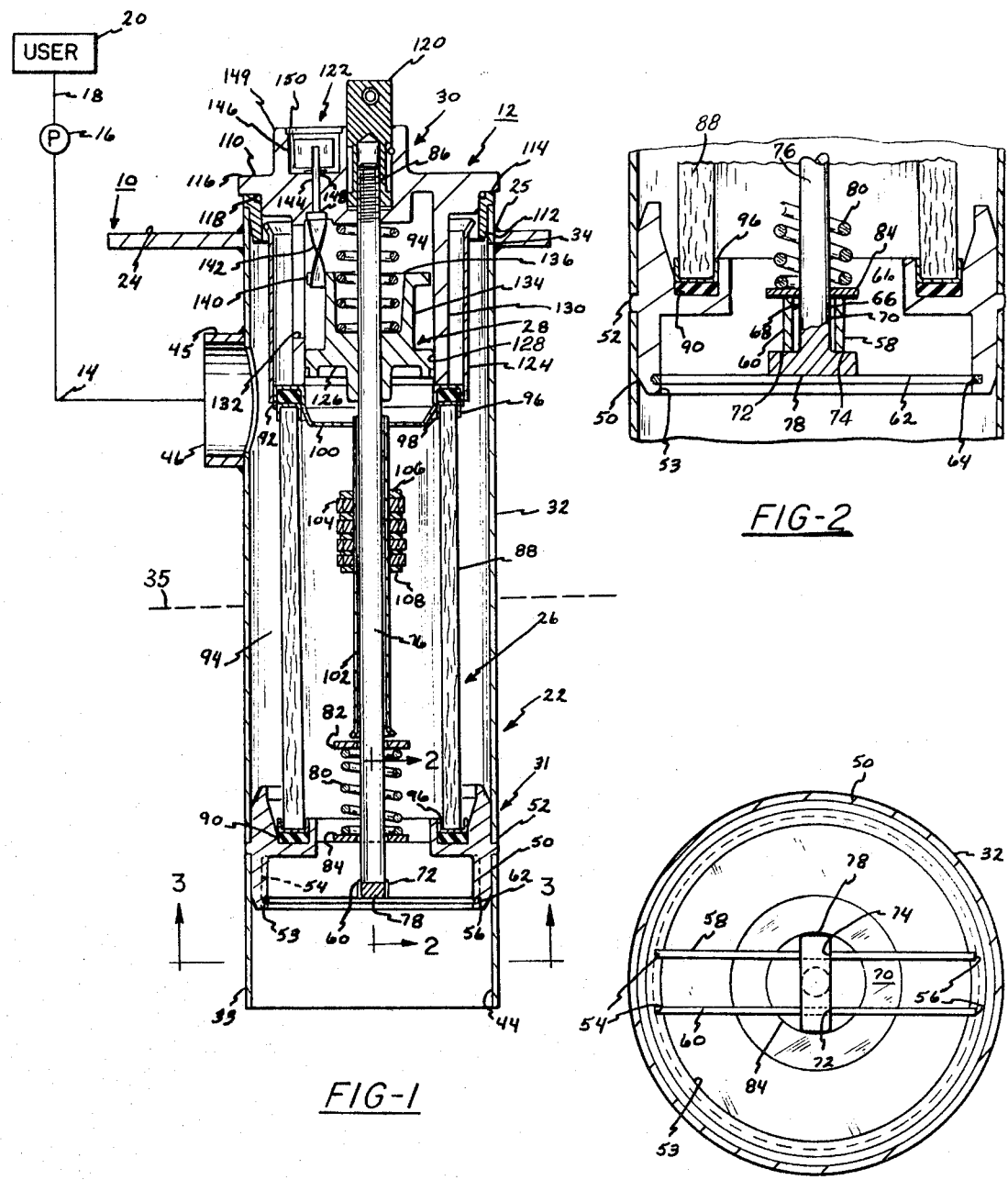
FIG. 1 is a longitudinal cross-sectional view of a fluid filter device illustrating a preferred embodiment of the present invention.
FIG. 2 is a fragmentary cross sectional view of the fluid filter device illustrated in FIG. 1 and taken on line 2—2 thereof.
FIG. 3 is a bottom cross-sectional view of the filter device illustrated in FIG. 1 and taken on line 3—3 thereof.

Referring to the drawing and particularly FIG. 1 wherein there is shown a portion of a fluid system comprising a reservoir 10 and a fluid filter device 12 mounted therein. Fluid from the reservoir 10 is drawn through the walls of the fluid filter device 12 into and a discharge line 14 by means of a pump 16 which, in turn, discharges pressurized fluid through a line 18 to a fluid user 20. The fluid filter device 12 is constructed of a series of sub-assemblies comprising a tubular housing 22 fixedly mounted to an upper plate 24 of the reservoir 10 by any suitable means, such as by welding as indicated at 25. The tubular housing 22 carries a main filter assembly 26, a bypass assembly 28, a cap assembly 30, and a rod support assembly 31, all of which will be described in greater detail hereinafter.

The tubular housing 22 comprises an upper elongated vertically mounted cylindrical housing member 32, having its upper end extending through a circular aperture 34 formed in the upper plate 24 of the reservoir 10. A lower cylindrical housing member 33 has a lower end extending below the normal level of fluid 35 within the reservoir 10. The upper portion of the cylindrical housing member 32 is welded to the upper plate 24 as indicated hereinbefore.

The lower portion of the cylindrical housing 33 is open to provide an inlet 44. A short tubular member 45 provides a lateral outlet 46 from the housing member 32 and is connected to the discharge line 14 by any suitable means.

The rod support assembly 31 is attached to the lower portion of the housing member 32 above the inlet 44 and includes an annular member 50. The upper and lower members of the housing 22 are joined by means of the annular member 50.

The annular member 50 has a peripheral annular lip 52 which is disposed between the upper and lower housing members 32 and 33 to insure a fluid tight relationship between the exterior surface of the annular member 50 and the interior of the housing 22. The annular member 50 has a central opening 53 which permits fluid flow upwardly from the inlet 44 into the interior of the upper housing member 32. The annular member 50 has two pairs of spaced and transversely aligned vertical slots 54 and 56 formed in the wall defining the opening 53 in which a pair of spaced parallel support plates 58 and 60 (FIG. 2) are received. Still referring to FIG. 2a retainer ring 62 received in an annular recess 64 formed in the wall defining the opening 53 abuts the lower edges of the plates to securely retain the plates in position. The inner opposing faces 66 and 68 of the plates 58 and 60, respectively, form a transversely extending opening, the axis of which intersects and is perpendicular to the longitudinal axis of the housing 22. The support plates 58 and 60 further include a pair of opposing rectangular notches 72 and 74 (FIGS. 2–3) which define a slot formed on an axis which is both perpendicular to and intersects the axis of the transversely extending opening 70 and the longitudinal axis of the tubular housing 22.

During assembly of the fluid device 12, an elongated vertical support rod 76, having a transversely extending section 78 formed at its lower end, is inserted within the housing 22 along the longitudinal axis of the housing 22 into the transversely extended opening 70 between the opposing walls 66 and 68 of the support plates 58 and 60 below the lower faces of the plates, and is then rotated 90° until the section 78 is longitudinally aligned with the notches 72 and 74. The elongated support rod 76 is then released to permit a spring 80 to urge the section 78 into the notches 72 and 74, whereupon relative rotational movement between the elongated support rod 76 and the tubular housing 22 is prevented. The support rod 76 is maintained within the notches 72 and 74 by the spring 80 which is disposed between the upper surface of the support plates 58 and 60 and a ring 82 which is welded or otherwise fixedly attached to the outer periphery of the support rod 76 at a position spaced above the end section 78. A second ring 84, disposed between the lower end of the spring 80 and the top surfaces of the plates 58 and 60, insures an even distribution of the biasing force of the spring 80. The support rod 76 extends axially upwardly along the longitudinal axis of the housing 22 and has an upper threaded portion 86 which extends above the upper end of the housing 22. The support rod 76 provides support for the main filter assembly 26, the bypass filter assembly 28 and the cap assembly 30.

The main filter assembly 26 comprises a conventional cylindrical filter element 88 having a side wall formed of a suitable porous filtering material. The filter element 88 is seated within an annular recess 90 formed at the top of the annular member 50. The filter element 88 is of such a length that is upper end 92 extends approximately to the midsection of the outlet 46. The periphery of the annular recess 90 and the lower portion of the filter element 88 form a fluid tight seal preventing direct communication between the interior of the filter 88 and the exterior thereof. The diameter of the filter element 88 is smaller than the diameter of the wall of the housing member 32 to form an annular chamber 94 therebetween.

The filter element 88 has an annular retainer element 96 attached to each of its opposite ends; each retainer element 96 having a substantially U-shaped cross-section. The upper retainer element 96 supports an annular frame member 98 which in turn has a central aperture 100 through which the elongated rod 76 extends. The annular frame member 98 supports an elongated tube 102 which extends downwardly therefrom and surrounds the rod 76. The tube 102 carries a plurality of permanent magnets 104 which are held in place within the interior of the filter element 88 by a pair of snap rings 106 and 108 disposed respectively above and below the magnets 104. The magnets 104 are provided to separate magnetically attracted particles from the system fluid as the fluid passes through the interior of the filter element 88. The tube 69 isolates the magnets 104 from the rod 76 to preclude binding due to any misalignment between the several parts.

The cap assembly 30 comprises a cap 110 having a central aperture 94 for receiving the threaded end 86 of the rod 76. The cap 110 closes off the upper end of the housing member 32. The upper end of the housing member 32 includes an annular member 112 having a shoulder 114 abutting the top peripheral edge of the housing member 32 and is secured thereto by any suitable means, such as by welding or a press fit. The cap 110 has an annular flange 116 seated on the upper end of the cylindrical housing member 32. An annular seal 118 carried at the juncture of the annular member 112 and the lower surface of the cap 110 provides a fluid tight seal therebetween. The cap 110 is locked in place by an externally threaded handle 120, the lower surface of which abuts the upper surface of the cap 110 when the handle is engaged with the threaded rod end 86. Tightening of the handle 120 onto threaded end 86 of the support rod 76 exerts a compression force on the cap 116 to maintain it against the upper portion of the tubular housing 22. Since the transverse section 78 at the lower end of the rod 76 is maintained within the plate slots 72 and 74, the support rod 76 will not rotate relative to the housing 22 when the handle 120 is threaded onto the support rod. The cap assembly 30 also supports a visual indicating means 112, the operation of which will be described in greater detail hereinafter.

The bypass filter assembly 28 is attached to the cap 110 and is normally removed and inserted as a unit within the cap 110 and comprises a cylindrical filter element 124 which is disposed between the upper surface of the annular member 96 and the bottom surface of the cap 110.

A cylindrical bypass valve 126 is slidably engaged with a cylindrically shaped annular valve seat 128 which is carried by a plurality of fingers 130 extending downwardly from the cap 110. Each of the fingers 130 is provided with apertures 132 therebetween to permit the passage of fluid from the interior thereof to the bypass filter element 124. The cylindrical bypass valve 126 has a tubular section 134 which closes communication between the upper and lower portions of the valve 126. The upper portion of the tubular section 134 functions as a seat for the lower end of a spring 136, the upper end of which acts against the cap 110 so that the bypass valve 126 is biased towards a closed position. In the closed position, bypass valve 126 closes off fluid communication between the interior of the main filter element 88 and the interior of the bypass filter 124.

The cylindrical bypass valve 126 is movable upwardly in response to a predetermined increase in the pressure differential between the inlet and outlet against the opposing bias of the spring 136. When the valve 126 is moved upwardly a sufficient distance to clear the plurality of annularly spaced apertures 132 so that fluid communication is opened between the interior of the filter element 88 and the bypass filter 124, fluid will flow from the reservoir through the interior of the filter element 88 across the bypass valve 126, radially outwardly through the bypass filter 124, into the chamber 94 and out the outlet port 46.

The axial movement of the bypass valve 126 is indicated by an indicating means 122. A slotted member 140 carried at the upper end of the bypass valve 126 engages an actuator member 142 which is supported for rotation by a pin 144. The actuator member 142 comprises an elongated flat strip having a uniform longitudinal twist so that the linear axial movement of the slotted member 140 rotates the pin 144. Pin 144 is supported for rotation in the cap 110 with its upper end extending above the surface of the cap 110 and supporting a pointer element 146. Seal members 148 provide a fluid tight seal between the pin 144 and the cap 110. A closed hollow boss 149 encloses the pointer element 146 and supports an indicia plate 150 above the pointer element 146. Plate 150 is provided with suitable indicia (not shown) to provide an attendant with a visual means for indicating whether or not the filter element 88 requires cleaning or replacement.

During normal operation of the filter device 12, the bypass valve 126 is in a closed position against the valve seat 128 so that the fluid communication between the interior of the filter element 88 and the interior of the bypass filter element 124 is closed off. The normal fluid flow circulation is axially through the annular member 50, into the interior of the filter element 88, and then radially outwardly into the annular chamber 94. Fluid passing through the annular chamber 94 is discharged through the outlet 46. Bypass valve 128 is movable between its closed position to an open position in which it is moved axially upwardly toward the cap 110. Its position is dependent upon the filtering condition of the filtering element 88. When fluid is flowing radially outwardly through the walls of the filter element 88, the element may accumulate sufficient foreign matter such that the pressure differential created between the upper and lower surfaces of the bypass valve 126 will cause the valve 126 to be shifted upwardly against the bias of the spring 136. As the bypass valve 126 moves from its normally closed position to its open bypass position, the pointer 146 of the indicator means 100 is rotated to a position wherein it registers with that indicia associated with the filtering condition of the filter element 88 so that the attendant is able to determine whether or not the filter element 88 requires cleaning or replacement.

When it is necessary to remove the cap 10 in order to clean or replace the main filter element 88 or to replenish the fluid within the reservoir 10, the handle 120 is disengaged from the threaded end 86 of the support rod 76 to permit the cap assembly 30 and the bypass assembly 28 to be removed as a unit from the housing member 32, while permitting the main filter element 88 to remain in place if replenishing of the reservoir 10 is desired. If the fluid filter element 88 is to be cleaned or replaced, the filter element 88 is withdrawn axially upwardly from the reservoir 10 along with tube 102 and then is separated from the support rod 76. Removal of the tube 102 carries the magnets 104 with it. Replacement of the filter element 88, the bypass assembly 30, and the cap 110 is completed in the reverse order.

During the assembly or disassembly of the filter device 12, the threaded end 86 on the support rod 76 may become damaged and thus prevent assembly of the cap 110 to the tubular housing member 32. In the prior devices, if the threaded end of the support rod were damaged, the entire filter housing 22 would require replacement as the lower end of the support rod 76 was normally welded to the lower portion of the tubular housing 22. In the present invention, if the threaded end 86 of the support rod 76 is damaged to the extent that the same may not be used, the support rod 76 may be removed and replaced by pushing the support rod 76 slightly downward against the bias of the spring 80 until the transverse section 78 clears the notches 72 and 74. The support rod 76 is then rotated 90° until the section 78 is aligned with the transversely extending opening 70. When so aligned, the support rod 76 may be lifted upwardly and withdrawn from the tubular housing 22. A new rod is simply replaced in a reverse manner, thereby permitting the re-assembly of the filter device 12 without the necessity of replacing the filter housing 22 as in the case of such previously used filter devices.

Although but one embodiment of the present invention has been described, it is to be understood that various changes and revisions can be made therein without departing from the spirit of the invention of the scope of the appended claims.

Having thus described the invention, what is claimed is as follows:

1. A fluid filter device comprising
   an elongated tubular housing having an inlet for receiving fluid and an outlet for discharging fluid;
   an elongated rod and means for mounting said rod within said housing in a position extending along the longitudinal axis of said tubular housing, said mounting means including means for normally preventing rotation of said rod about its axis;
   fluid filtering means carried by said rod in said housing for filtering fluid flowing between said inlet and said outlet;
   a cap enclosing an open end of said housing, one end of said rod extending through said cap and means rotatably mounted to the end of said rod for retaining said cap in position,
   said filter means being adapted to be selectively removed and replaced through said open end of said housing when said cap is removed from said rod,
   said means for mounting said rod to said housing comprising said housing having a transverse wall member extending from one side to the other at an interiorly disposed section thereof, said wall section having a transversely extending through slot and at least one recess formed at the inner end of said wall section registering with but extending angularly with respect to said through slot, said rod having an end section extending transversely to the longitudinal axis of said rod, said end section being insertable longitudinally through said slot and receivable in said recess whereby as long as said end section is in said recess said rod is non-rotatably mounted to said housing and biasing means urging said rod in an axial direction urging said end section into said recess.

2. The fluid filter device as defined in claim 1 and in which said through slot is formed by a second transverse wall member spaced from and parallel to said first mentioned wall member.

3. The fluid filter device as defined in claim 2 and in which said recess is formed in both of said all members.

4. The fluid filter device in claim 1 wherein said means for mounting said cap to said housing further comprises said one end of said rod having a threaded surface adapted to threadably engage a threaded surface formed in said cap to secure said cap to said elongated tubular housing.

5. The fluid filter device defined in claim 1 wherein said biasing means comprises a spring disposed around said rod, one end of said spring being carried by said rod, the other end of said spring carried at the top of said wall section, said spring urging said end section into said recess when said rod is rotated to bring said end section into said recess.

6. The fluid filter device defined in claim 5 wherein said means for mounting said cap to said housing further comprises one end of said rod having a threaded surface threadably engaging a threaded surface formed in said cap for securing said cap to said elongated tubular housing when said rod is in said rotated position.

* * * * *

RFC-1420-DS

UNITED STATES PATENT OFFICE
CERTIFICATE OF CORRECTION

Patent No. 3,653,512    Dated April 4, 1972

Inventor(s) Carl A. Brown

It is certified that error appears in the above-identified patent and that said Letters Patent are hereby corrected as shown below:

Column 2, line 35, delete "into" and after "and insert --into--;

Column 2, line 72, delete "2a" and insert --2 a--

Column 4, line 11, after "means" delete "112" and insert --122--;

Column 6, line 35, after "of said" delete "all" and insert --wall--

Signed and sealed this 25th day of July 1972.

(SEAL)
Attest:

EDWARD M. FLETCHER, JR.
Attesting Officer

ROBERT GOTTSCHALK
Commissioner of Patents